(12) United States Patent
Abare et al.

(10) Patent No.: US 6,627,016 B2
(45) Date of Patent: Sep. 30, 2003

(54) ROBOTIC ASSEMBLY PROCESS FOR PLASTIC COMPONENTS

(75) Inventors: Joe Abare, Teeterville (CA); Marius Batrin, Mississauga (CA); Mark Greaves, Smithville (CA); John Iacobucci, Hamilton (CA); Stephen Kelly, Richmond Hill (CA); Ugo Orlandi, Georgetown (CA); Lorenzo Pisan, Neenah, WI (US)

(73) Assignee: ABB, Inc. (Flexible Automation Division), Ontario (CA)

( * ) Notice: Subject to any disclaimer, the term of this patent is extended or adjusted under 35 U.S.C. 154(b) by 145 days.

(21) Appl. No.: 09/983,558

(22) Filed: Oct. 25, 2001

(65) Prior Publication Data

US 2003/0079819 A1 May 1, 2003

(51) Int. Cl.[7] .............................................. B32B 31/10
(52) U.S. Cl. ....................... 156/64; 156/73.5; 156/73.6; 29/430
(58) Field of Search ........................ 156/64, 73.5, 73.6, 156/367, 362, 363, 352, 368, 557, 580, 256, 258; 29/428, 429, 430

(56) References Cited

U.S. PATENT DOCUMENTS

| | | | |
|---|---|---|---|
| 5,182,850 A | * | 2/1993 | Kondo et al. ................. 29/784 |
| 6,273,980 B1 | * | 8/2001 | Akiyama et al. ........... 156/73.5 |
| 6,296,726 B1 | * | 10/2001 | Pencak ......................... 156/64 |
| 6,389,672 B1 | * | 5/2002 | Ishii et al. ..................... 29/430 |
| 6,454,891 B1 | * | 9/2002 | Goss .......................... 156/73.5 |

* cited by examiner

Primary Examiner—Richard Crispino
Assistant Examiner—George R. Koch, III
(74) Attorney, Agent, or Firm—Paul J. Field

(57) ABSTRACT

A method of robotic assembly, for manufacturing plastic components from parts mounted upon a plastic shell, using an integrated system of material handling and robots following a programmed series of operations. The robot cells carry out the following steps: (a) scanning the pallet and identifying that the pallet is locked in the docked position of the cell; (b) scanning an assembly area of the shell and communicating location and planarity data to the robot of the cell; (c) selecting a plastic part from a part supply device with the robot; (d) welding the part to the assembly surface of the plastic shell using the robot to perform a spin or fusion welding process. (e) determining the performance status of the foregoing cell steps and identifying the status as: good; scrap or rework. Good status results in conveyance of the loaded pallet for processing at any succeeding cell, but rework and scrap status result in conveyance of the loaded pallet to the unload station without processing at any succeeding cell.

15 Claims, 4 Drawing Sheets

ROBOTIC ASSEMBLY PROCESS FOR PLASTIC COMPONENTS

TECHNICAL FIELD

The invention relates to a method for manufacturing plastic components of parts mounted upon a plastic shell, using an integrated system of material handling and robots following a programmed series of operations, including spin welding and fusion welding performed by specially adapted industrial robots in work cells.

BACKGROUND OF THE ART

Manufacturing assembly processes are often automated with dedicated mechanical systems that are primarily arranged for a single product or very limited range of similar products. Technically advanced flexible systems are also used that utilize robots capable of being programmed and rapidly re-tooled for different operations relatively quickly compared to dedicated systems that require substantial physical rearrangement of their components.

Manufacturers are currently under increasing pressure to deliver lower volumes of manufactured components within shorter time frames. For example, many automobile manufacturers require "just in time" delivery and maintain a minimal level of inventory. While these practices increase efficiency and reduce costs, they come at the expense of requiring suppliers and parts manufacturers to respond very quickly to changes in design or model type. Such practices simultaneously reduce the number of identical parts ordered in a single batch and parts manufacturers do not benefit from the long part life cycles or economies of scale that once were common. Current manufacturing procedures therefore require a high degree of flexibility to deal with relatively short runs of parts that can vary considerably from order to order.

In the present description, the example of a blow molded plastic fuel tank for automotive applications will be used as an example. It will be understood however that the method described is suitable for any plastic assembly. For example, plastic fender modules, plastic dashboard modules, plastic door panel modules, plastic roof panel modules or plastic windshield modules or for any non-automotive plastic assembly as well.

The present invention provides an integrated material handling and robotic assembly system where plastic components are assembled through a progressive series of robot work cells. By providing robotic assembly and standardized pallets conveyed on the integrated material handling system, the invention provides the advantage of a high degree of inherent flexibility as opposed to conventional hard or dedicated automation methodss.

For example, in the automotive industry, the majority of assembly line systems currently represent a hard automation system which usually does not include industrial robots, but rather is a dedicated configuration specifically designed and set up for manufacturing a specific component preferably with very limited modification or variety. The hard automation systems are relatively low cost due to the low technical sophistication required. However, a major disadvantage of such hard or dedicated automation systems is that the part life cycles of automotive components are becoming increasingly shorter and as a result, the costs of retooling and realigning such dedicated systems is becoming an increasingly important component of delivery time and of costs involved. Hard automation or dedicated lines are ideally suited for assemblies that do not change significantly over time and as a result the manufacturer can achieve the benefits of long term economies of scale. Hard or dedicated automation is tailored for low cost manufacturing of large orders over long periods of time.

High volumes of identical components result relatively low cost manufacturing and low technical sophistication is required in automating such operations. Once a dedicated line is established, maximum efficiency results from minimal modifications to the configuration during the life cycle of the specific components that are produced by the dedicated line. The more variety there is in the parts manufactured, the more effort and downtime involved in modifying the dedicated line, and efficiency decreases.

However, as mentioned above, current manufacturing and purchasing practices are much different than in the past. Volume of components ordered are relatively small, purchasers may require several manufacturers to produce the identical component in relatively small batches to increase competition, fast track production and reduce delivery time. The length of time during which a component retains its initial characteristics without any change have been drastically reduced. Numerous variations and modifications are now demanded and therefore a more flexible system of manufacturing is in demand.

It is an object of the present invention to provide an integrated system of material handling and robotic assembly to provide flexible manufacturing methods with ease of change overs between different plastic components, while providing a competitive cycle time relative to conventional dedicated assembly lines.

It is a further object of the invention to provide a high degree of accuracy and repeatability for manufacturing plastic components through the use of vision and laser scanning of parts and areas to which they are assembled.

It is a further object of the invention to optimize productivity of manufacturing plastic components utilizing robots that operate to fusion weld parts and spin weld parts in a flexible plastic component automated manufacturing system.

Further objects of the invention will be apparent from review of the disclosure, drawings and description of the invention below.

DISCLOSURE OF THE INVENTION

The invention provides a method robotic assembly, for manufacturing plastic components from parts mounted upon a plastic shell, using an integrated system of material handling and robots following a programmed series of operations.

Shells are progressively conveyed between a loading station and an unloading station through a number of robot work cells. The method generally includes: (1) loading and securing each shell into a fixture mounted on an associated standardized pallet at the loading station; (2) moving each loaded pallet sequentially on a conveyor to a stationary docked position at each successive robot work cell; (3) moving each loaded pallet from the docked position to the unload station; (4) determining the quality of each completed plastic component from system data accumulated from each robot cell and qualifying each completed component as good; scrap; or rework; (5) unloading each completed component from the associated pallet; and (6) conveying empty pallets to the loading station.

Further, the following cell steps are performed in one or more robot cells: (a) scanning the pallet and identifying that the pallet is locked in the proper docked position of the cell; (b) scanning an assembly area of the plastic shell and communicating location and planarity data to the associated robot of the cell; (c) selecting a plastic part from a part supply device with the robot; (d) welding the part to the assembly surface of the plastic shell using the robot to perform a spin welding or a fusion welding process. The spin welding process includes: engaging a mounting surface of the part with the assembly surface of the shell; rotating the part until the mounting and assembly surfaces are heated; and applying pressure to the part sufficient to fuse the mounting and assembly surfaces together. The fusion welding includes: simultaneously heating the mounting and assembly surfaces with heaters; and applying pressure to the part sufficient to fuse the mounting and assembly surfaces together; (e) determining the performance status of the foregoing cell steps and identifying the status as: good; scrap or rework. Good status results in conveyance of the loaded pallet for processing at any succeeding cell, but rework and scrap status result in conveyance of the loaded pallet to the unload station without processing at any succeeding cell.

As a result, a high degree of flexibility is provided in the integrated system of material handling and robotic assembly. For example, the pallets and material-handling conveyor can be reconfigured easily for any number of blow molded fuel tanks currently in existence as well as other plastic automotive assemblies such as fenders, door panels and dashboards. The standarized pallets can be readily modified with a variety of removable fixture attachments and of course the industrial robots can be readily reprogrammed for any number of operations. Retooling therefore is reduced to a minimum. Unlike a fixed configuration dedicated line, the present flexible configuration requires minimal physical modification since the robot and material handling programming accomodate the changes. Physical change over of the specialized robot end of arm tools, and possible reconfiguring of the pallet fixtures complement the reprogramming of the robot and material handling operations. In contrast, the prior art dedicated assemblies often require complete overhall and repositioning of assembly line components when different parts are to be manufactured.

The increased flexibility of integrated material handling and robotic assembly enables the manufacturer to rapidly tailor the robot assembly system for a wide variety of styles and products without changing the basic structure of the assembly system. As a result, there can be rapid change over and retooling providing significant advantage.

An advantage of the prior art dedicated line is relatively low cost due to low technical sophistication. However when a manufacturer is faced with a low volume of identical parts and high number of variations in part configurations, the low capital cost of a dedicated line is overcome by the high cost of retooling and down time during change overs to suit different styles and products. In contrast, the flexible robot assembly system with integrated material handling is relatively simple to modify for different styles and products. Highly standardized pallets, conveyors and robots enable a wide range of different styles and products to be manufactured with much less cost and downtime during any necessary retooling and reprogramming.

Further, accuracy and repeatability of manufacturing processes are increased through vision and laser scanner capabilities that locate and identify assembly areas, and adapt to accommodate relatively large tolerances when compared to a dedicated system that has limited capability to accommodate a large tolerance in the configuration of components.

Therefore, in contrast to dedicated assembly lines where it is often necessary to build an entirely new assembly line for different components or when significant changes in component design are encountered, the present invention provides an integrated material handling and robotic assembly system that in the long term provides significant capital expenditure savings due to the flexibility inherent in its technically sophisticated structure.

The integrated system combines compact and readily modified standarized pallets and industrial robot end of arm tooling that are readily changed over and reprogrammed to accomodate various components. Industrial robots can perform various operations such as cutting, spin welding, fusion or hot plate welding on a wide variety of plastic components such as blow molded fuel tanks. Industrial robots can accommodate combination tools which enable a single robot to perform multiple functions simultaneously, combined with 3-D optical vision and laser scanning systems for accurate placement and fine-tuning of part positioning. Part supply trays, bowl feeders, part magazines or dial feeding systems together with integrated palletized conveyors and controls are relatively expensive on initial capital outlay however as mentioned above the inherent flexibility provides rapid change overs in a compact system such that a wide variety of different components of various sizes are readily adapted without major modification or significant downtime.

Further advantages of the invention will be apparent from the accompanying drawings and detailed description of one example embodiment of the invention herein.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
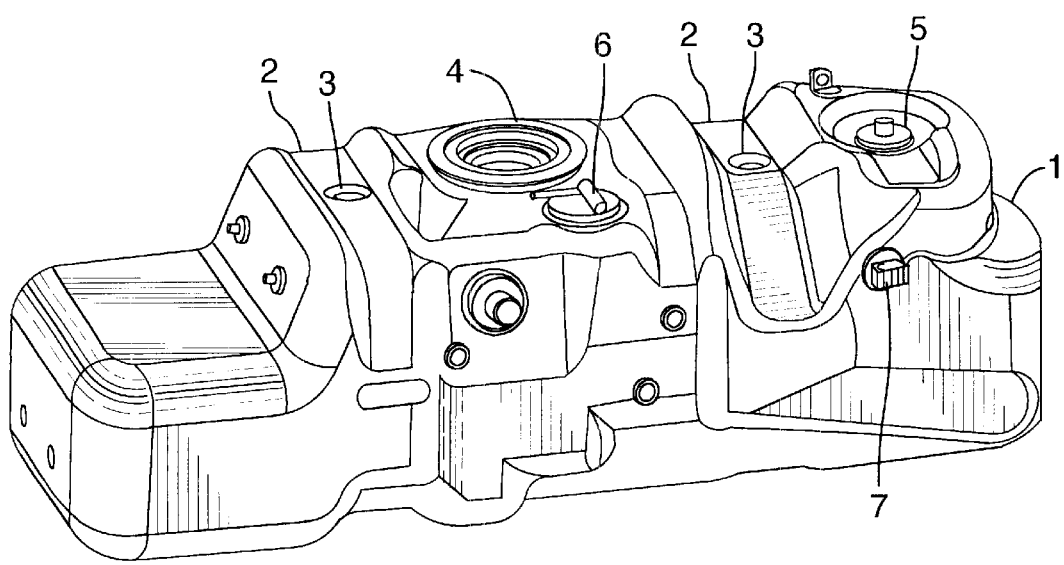
FIG. 1 is a perspective view of a plastic component that can be manufactured utilizing the present invention including a blow molded plastic fuel tank shell with a number of different plastic fittings or openings that are cut and welded to the exterior surface of the plastic fuel tank.

FIG. 1 is the perspective view a plastic blow molded fuel tank 1 for an automobile which is introduced into the assembly system after it has been blow molded in a conventional manner.

As will recognized by those skilled in the art, blow molding of plastic components results in significant variation in the planarity and location of assembly areas onto which various fittings are placed due to inherent shrinkage, and temperature variations. As a result therefore the robotic assembly system incorporates vision and laser scanning of assembly areas to determine any offsets and adjustments necessary to adjust the positioning of the robot tool accordingly. The fuel tank 1 includes two recesses 2 for mounting straps to the automobile as well as a conical recess 3 for location purposes. The present invention relates to spin welding and hot plate or fusion welding of the various plastic parts which are assembled on the exterior surface of the fuel tank 1 using robotic assembly as described below.

Although the present description relates to an example of a plastic fuel tank, it will be understood that any plastic component can likewise be assembled with appropriate modifications, such as automotive sub-assemblies including plastic fenders, dashboards, door panels, roof panels and windshield modules.

In the example shown in FIG. 1, the plastic fuel tank is assembled together with the following plastic parts: a sender ring 4, a fuel valve fitting 5, a filter tube fitting 6, mounting clip 7 and other clips, studs and fittings as illustrated.

In general, the smaller fittings do not puncture the tank wall and can be secured by spin welding which involves engaging a mounting surface of the part with the assembly surface of the plastic shell 1, rotating the part until the mounting and assembly surfaces are heated and applying sufficient pressure to the part to fuse the mounting and assembly surfaces together. In the case of spin welding, the fuel tank wall is not cut or punctured, but rather the exterior assembly surface is heated and fused with the mounting surface of the part. The larger parts 4, 5, and 6 however require an opening to be cut. The cutting robots are fitted with a specialized robotic tool; preferably comprising two knives mounted on a turret for rotation about an axis that is common to the center of the opening.

Fusion welding comprises simultaneously heating the mounting surface of the part and the assembly surface of the fuel tank 1 with heaters such as electric hot plate heaters and applying sufficient pressure to the part to fuse the mounting and assembly surfaces together without impeding the opening that is cut using the rotary knives.

Figure 2:
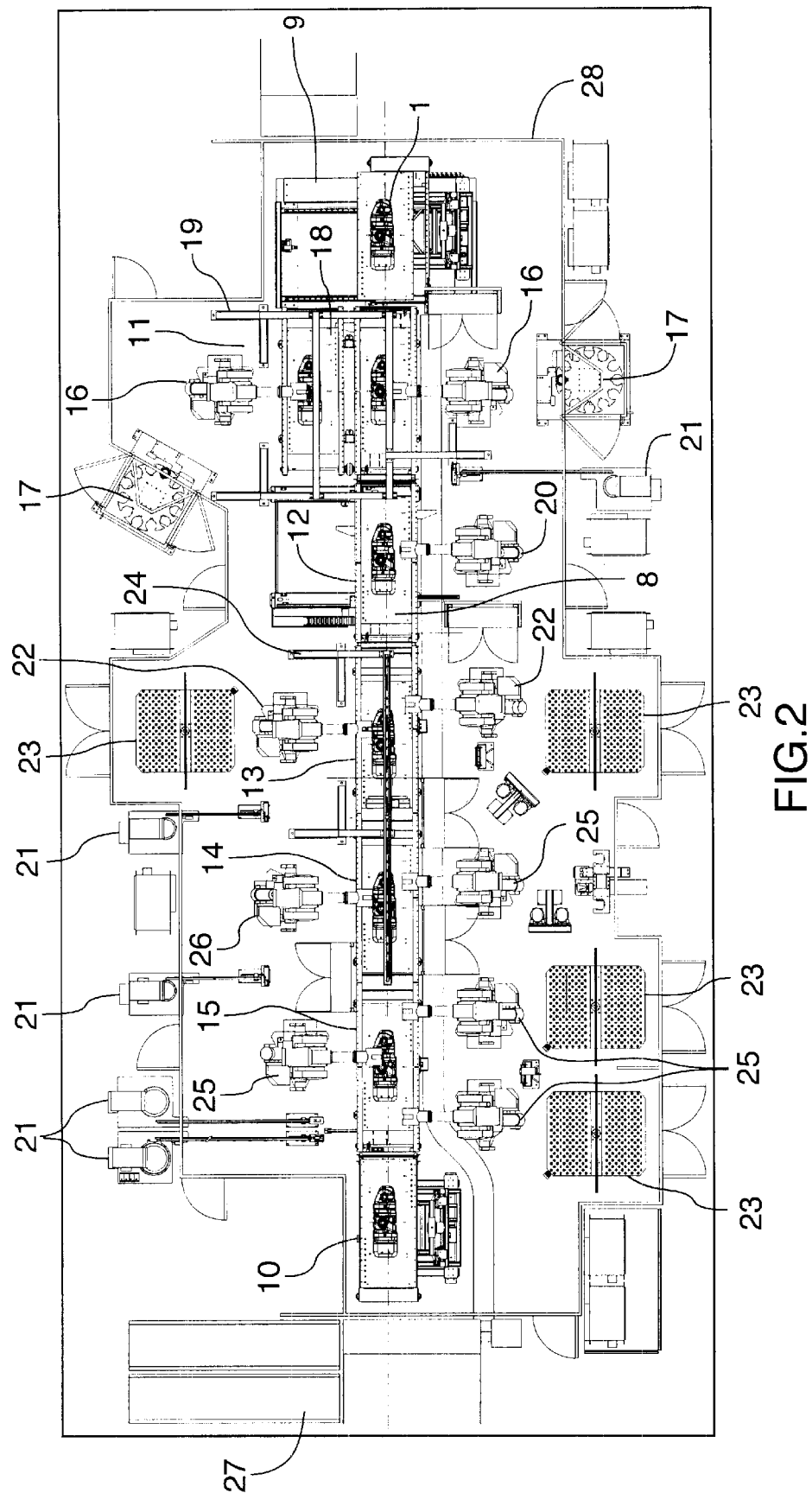
FIG. 2 is an aerial plan view of the assembly system with flow of pallets and shells from right to left proceeding on a conveyor and passing through a loading station, five robot work cells and unload station including part tray feeders, bowl feeders and dial feeders with overhead vision and laser scanning supports.

FIG. 2 shows an overhead plan view of the integrated system with material handling conveyor 8 and ten robots at five separate robot work cell stations following a preprogrammed series of operations as follows. The fuel tank shells 1 are progressively conveyed from right to left between the loading station 9 and the unloading station 10 through five separate robot work cells 11, 12, 13, 14 and 15.

The conveyor 8 includes an upper track on which the manufacturing steps in each cell are performed as the tanks 1 are conveyed from right to left mounted on standardized pallets and secured in fixtures tailored for each type of fuel tank 1. The conveyor 8 also includes a lower track beneath the upper track on which the empty pallets are conveyed from left to right between the unloading station 10 and the loading station 9. The loading and unloading stations 9 and 10 have pallet elevators adapted to convey the empty pallets between the upper and lower tracks of the conveyor 8. In this manner the pallets are recycled by returning on the lower track beneath the upper track of the conveyor 8 in a continuous cycle.

The first cell 11 is equipped with two separate 60 kilogram six axis robots 16 with an end of arm tool adapted to fusion weld the sender ring 4. Parts are selected by the robots 16 from a part supply dial storage unit 17. Since the cycle time for welding the sender ring 4 is approximately twice that of the other operations in cells 12, 13, 14 and 15, the first cell 11 includes duplicate robots 16, two dial storage units 17 and a shifting conveyor assembly 18 that works in conjunction with the loading station 9 to accept loaded pallets from the loading station in two different positions and forward the loaded pallets longitudinally towards the second cell 12.

At the loading station 9, each plastic fuel tank shell is loaded and secured into a fixture mounted on an associated pallet. In the drawings, the pallet is a rectangular planar member with a flat top surface that includes removable saddles, clamps or other fixtures to secure the various fuel tanks 1 in a fixed position relative to the pallet. Each loaded pallet is then moved sequentially on the conveyor 8 to a stationary docked position as shown in FIG. 2 at each successive robot work cell 11, 12, 13, 14 and 15.

After all fittings and parts have been spin welded or fusion welded to the plastic fuel tank 1, the loaded pallets are sequentially moved from the docked position in the fifth cell 15 to the unloading station 10. At the unloading station 10 the quality of each completed plastic component 1 is determined from the system data that is accumulated from each robot cell 11 through 15 and each completed component 1 is qualified either as "good" passing the required quality assurance test, "scrap" or "rework" depending on the specific data provided. At the unloading station 10 each component 1 is unloaded from the associated pallet and empty pallets are conveyed to the loading station 9 on the lower track of the conveyor 8.

In the embodiment shown, all robot work cells 11, 12, 13, 14 and 15 are configured to perform plastic welding namely either spin welding or fusion welding. However, it will be understood that robots and components can be configured for any other assembly operation such as cutting, drilling, stamping, or painting.

The claimed invention includes at least one robot work cell 11-15 that performs the following cells steps. For example, as shown in FIG. 2, the first cell 11 scans the pallet and identifies the pallet is locked of the proper docked position of the cell 11. Overhead support 19 supports optical vision and scanner equipment to examine the assembly areas of the fuel tank shell 1. The conveyor 8 includes devices to scan reference areas of the pallet whereas the support 19 includes means to scan the assembly area of the shell 1 and communicate location and planarity data to the robots 16 of the cell 11. Scanners can be selected from laser scanners, optical scanners, ultrasound scanners or X-ray scanners depending on the application. In the embodiment illustrated, 3-D visual scanners and laser scanners are utilized and supported on the overhead support 19.

Once scanning is complete and an acceptable location and planarity are determined for the appropriate assembly area of the tank 1, the robot 16 rotates to select a plastic part from the part supply device, in this case the dial storage unit 17. The sender ring 4 assembled in the first cell 11 is a relatively large device which requires fusion welding. A specially designed combination tool simultaneously heats the mounting surface of the part and assembly surface of the tank 1 with hot plate electric heaters. Once the surfaces are softened with heat, the tool rotates and assembles the mounting surface of the part onto the assembly surface of the tank 1, applies pressure to the part sufficient to fuse the surfaces together and completes the assembly function for cell 11.

Thereafter, the conveyor 8 (including shifting conveyor assembly 18) moves the loaded pallet from the first cell 11 to the second cell 12. In the second cell 12, the part to be attached is relatively small and spin welding is utilized. The robot 20 is a 45 kilogram/6-axis robot that picks relatively small parts from a bowl feeder 21. As mentioned above, the spin welding process includes engaging the mounting surface of the selective part with the assembly surface of the plastic shell 1. Contact between the rotating part creates heat and sufficient pressure is applied to the parts in order to fuse the mounting surface of the part and assembly surface of the tank 1 together. A rapidly rotating tool on the arm end of robot 20 holds the part and rotates rapidly enough to create heat that melts the plastic surfaces and fuses the components together.

Once the spin welding operation in the second cell 12 is completed, the loaded pallet is conveyed to the third cell 13 where two individual robots 22 select additional parts from two external tray magazines 23. The third cell 13 also includes an overhead scanner support 24 that can supports 3-D optical vision scanners or laser scanners depending on the requirements. In the third cell 13, two robots 22 operate independently and increase cycle time by affixing various fittings to opposite sides of the fuel tank 1.

Once the operation in the third cell 13 is complete the loaded pallet is conveyed to the fourth cell 14. Again, robots 25 and 26 are provided on opposite sides of the pallet to increase overall assembly cycle time. Robot 25 is equipped with a knife cutting tool that includes two knives mounted on a turret for rotation of a common axis of the opening to trim an opening in the sender ring of the fuel tank. Robot 26 is equipped with spin welding tools for attaching further small fittings to the fuel tank 1.

On completion of the welding and cutting operation in the fourth cell 14, the loaded pallet is conveyed to the fifth cell 15 that includes three robots 25 each independently performing fill or spin welding operations and selecting components from the external tray magazine 23 and bowl part fittings 21.

After completion of the operations in the fifth cell 15, the loaded pallet is conveyed to the unloading station 10. The performance status of the foregoing cell steps are determined and the status of the completed fuel tank 1 is identified as "good", "scrap" or "rework". A good status results in conveyance of the loaded pallet to succeeding cells. Rework or scrap status results in conveyance of the loaded pallet to the unload station through the cells without processing at any succeeding cell.

In the first cell 11, the combination tool includes a first heater that heats the mounting surface of the part while a second heater simultaneously heat the assembly surface of the shell. In this manner, it is assured that both surfaces are heated to a sufficient degree simultaneously for fusing immediately afterwards.

The integrated system as well includes programmable logic controls in housing 27 that communicates with the conveyor 8, the loading station 9 and the unloading station 10 as well as each robot cell 11, 12, 13, 14 and 15 coordinating and controlling the entire process. Of course, for safety reasons the system includes a perimeter guard 28 in conjunction with safety fencing with perimeter detection devices adapted to abort robot cell operations within the perimeter 28.

Figure 3:
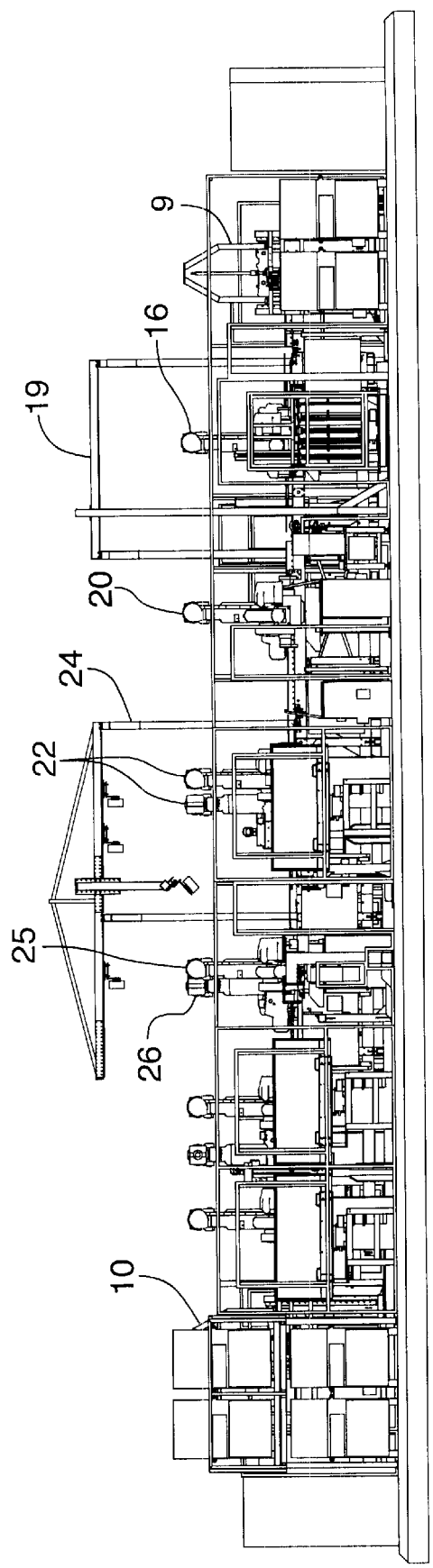
FIG. 3 is a side elevation view of the integrated material handling and robot assembly system also conveying from right to left between the loading station and unloading station through five intervening robot assembly cells.
Figure 4:
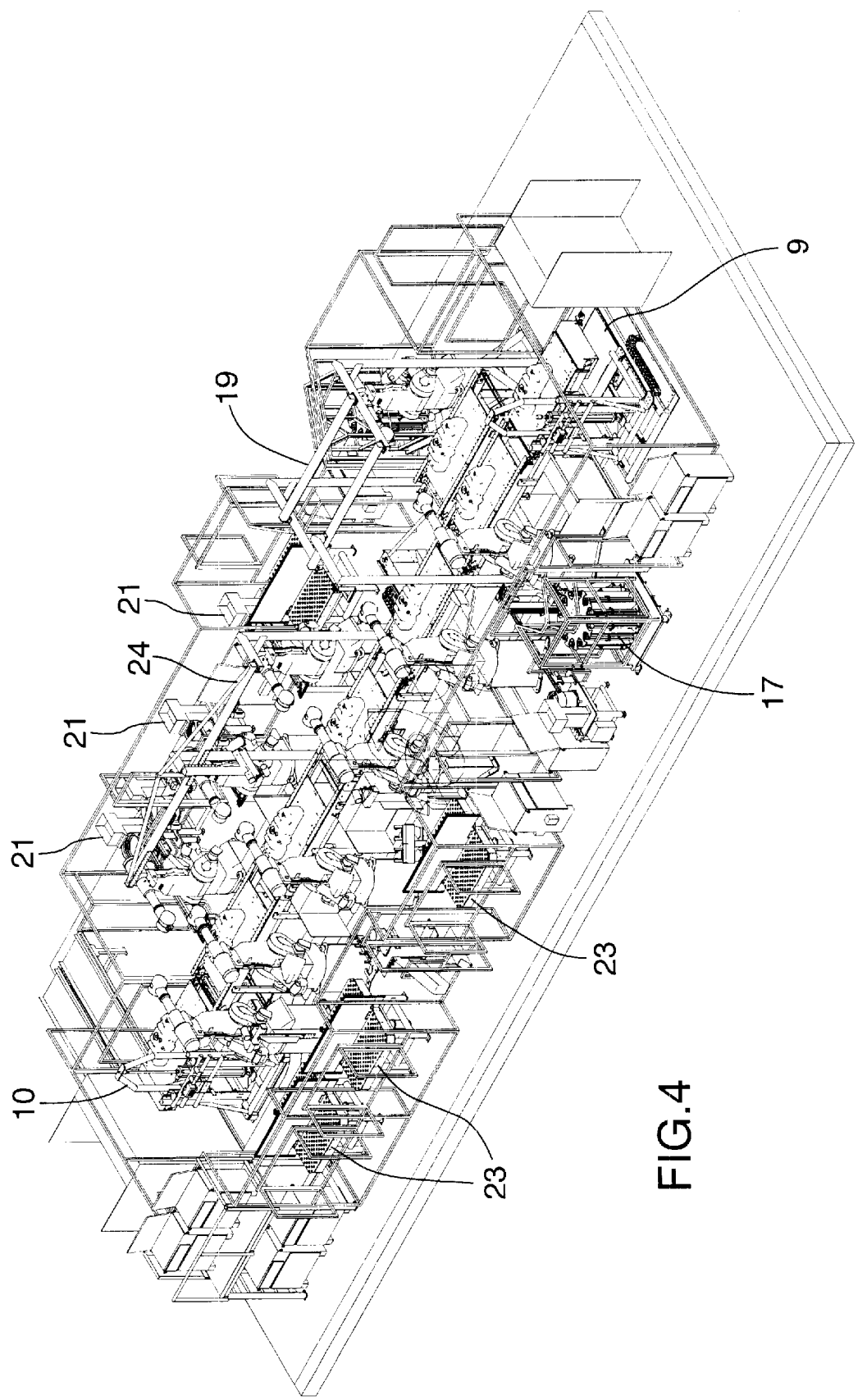
FIG. 4 is a perspective upper view of the integrated system.

FIGS. 3 and 4 show different views of the same integrated system for clarity.

Although the above description relates to a specific preferred embodiment as presently contemplated by the inventors, it will be understood that the invention in its broad aspect includes mechanical and functional equivalents of the elements described herein.

We claim:

1. A method of robotic assembly, for manufacturing plastic components from a plurality of parts mounted upon a plastic shell, using an integrated system of material handling and a plurality of robots following a programmed series of operations, wherein shells are progressively conveyed between a loading station and an unloading station through a plurality of robot work cells, the method comprising the steps of:

loading and securing each shell into a fixture mounted on an associated pallet at the loading station;

moving each loaded pallet sequentially on a conveyor to a stationary docked position at each successive robot work cell;

moving each loaded pallet from said docked position to the unload station;

determining the quality of each completed plastic component from system data accumulated from each robot cell and qualifying each completed component as having a quality selected from the group consisting of: good; scrap; and rework;

unloading each completed component from the associated pallet; and conveying empty pallets to the loading station;

wherein at least one robot cell performs the following cell steps:

scanning the pallet and identifying that the pallet is locked in the docked position of the cell;

scanning an assembly area of the shell and communicating location and planarity data to the robot of the cell;

selecting a plastic part from a part supply device with the robot;

welding the part to the assembly surface of the plastic shell using the robot to perform a welding process selected from the group consisting of: spin welding; and fusion welding, wherein spin welding comprises: engaging a mounting surface of the part with the assembly surface of the shell; rotating the part until the mounting and assembly surfaces are heated; and applying pressure to the part sufficient to fuse the mounting and assembly surfaces together; and wherein fusion welding comprises: simultaneously heating the mounting and assembly surfaces with heaters; and applying pressure to the part sufficient to fuse the mounting and assembly surfaces together; and determining the performance status of the foregoing cell steps and identifying the status as one of: good; scrap and rework, whereas good status results in conveyance of the loaded pallet for processing at any succeeding cell, and whereas rework and scrap status result in conveyance of the loaded pallet to the unload station without processing at any succeeding cell.

2. A method of robotic assembly according to claim 1, wherein the cell steps further include:

cutting an opening in the shell using a cutting tool mounted to the robot.

3. A method of robotic assembly according to claim 2, wherein the cutting tool comprises at least two knives mounted to a turret for rotation about a common axis of said opening.

4. A method of robotic assembly according to claim 1, wherein during fusion welding, a first heater heats the mounting surface of the part while a second heater heats the assembly surface of the shell.

5. A method of robotic assembly according to claim 1, wherein the conveyor comprises: an upper track upon which the cell steps are performed; and a lower track upon which empty pallets are conveyed from the unloading station to the loading station, and wherein the loading and unloading stations include pallet elevators adapted to convey empty pallets between the upper and lower tracks of the conveyor.

6. A method of robotic assembly according to claim 1, wherein the scanning step is performed using a scanner selected from the group consisting of: a laser scanner; an optical scanner; an ultrasound scanner; and an x-ray scanner.

7. A method of robotic assembly according to claim 6, wherein the scanner is mounted on an overhead support structure above the upper conveyor track of the robot cell.

8. A method of robotic assembly according to claim 1, wherein the plastic component comprises an automotive subassembly selected from the group consisting of: a plastic fuel tank; a plastic fender module; a plastic dash board module; a plastic door panel module; a plastic roof panel module; and a plastic windshield module.

9. A method of robotic assembly according to claim 8, wherein the plastic component comprises a plastic fuel tank and wherein the plastic parts assembled thereto are selected from the group consisting of: a sender ring; a fuel valve; a filter tube fitting; a handle; and a mounting clip.

10. A method of robotic assembly according to claim 8, wherein the plastic component comprises a blow molded plastic fuel tank shell.

11. A method of robotic assembly according to claim 10, wherein the blow molded shell includes locating recesses and wherein the pallet fixture includes mounts adapted to engage said recesses.

12. A method of robotic assembly according to claim 11, wherein the fixture includes clamps adapted to engage the recesses.

13. A method of robotic assembly according to claim 1, wherein the integrated system includes programmable logic controls (PLC) in communication with the conveyor, the loading station, the unloading station and each robot work cell.

14. A method of robotic assembly according to claim 1, wherein the part supply device is selected from the group consisting of: an external tray magazine; a bowl feeder; and a dial feeder.

15. A method of robotic assembly according to claim 1, wherein the integrated system includes a perimeter detection device adapted to abort robot cell operation.

* * * * *